United States Patent [19]

Rao

[11] 4,225,102

[45] Sep. 30, 1980

[54] AERODYNAMIC SIDE-FORCE ALLEVIATOR MEANS

[75] Inventor: Robert A. Frosch, Administrator of the National Aeronautics and Space Administration, with respect to an invention of Dhanvada M. Rao, Hampton, Va.

[73] Assignee: The United States of America as represented by the Administrator of the National Aeronautics and Space Administration, Washington, D.C.

[21] Appl. No.: 19,541

[22] Filed: Mar. 12, 1979

[51] Int. Cl.³ .................. B64C 1/00; B64C 21/00
[52] U.S. Cl. .................. 244/130; 102/56 R; 102/92.1; 244/119
[58] Field of Search ............ 244/119, 117 R, 130, 244/198, 199, 200, 324, 14; 102/34, 34.1, 37.1, 38 R, 56, 92.1

[56] References Cited

U.S. PATENT DOCUMENTS

| 871,825 | 11/1907 | Schupmann | 102/92.1 |
| 1,596,180 | 8/1926 | Henderson | 102/56 |
| 2,980,370 | 4/1961 | Takacs | 244/130 |
| 3,877,665 | 4/1975 | Riccius | 244/130 |

FOREIGN PATENT DOCUMENTS 821935 10/1959 United Kingdom ............ 244/130

Primary Examiner—Barry L. Kelmachter
Attorney, Agent, or Firm—Wallace J. Nelson; John R. Manning; Howard J. Osborn

[57] ABSTRACT

Apparatus for alleviating high angle-of-attack side force on slender pointed cylindrical forebodies such as fighter aircraft, missiles and the like and employing a symmetrical pair of helical separation trips to disrupt the leeside vortices normally attained. The symmetrical pair of trips start at either a common point or at spaced points on the upper surface of the forebody and extend along separate helical paths along the circumference of the forebody.

6 Claims, 10 Drawing Figures

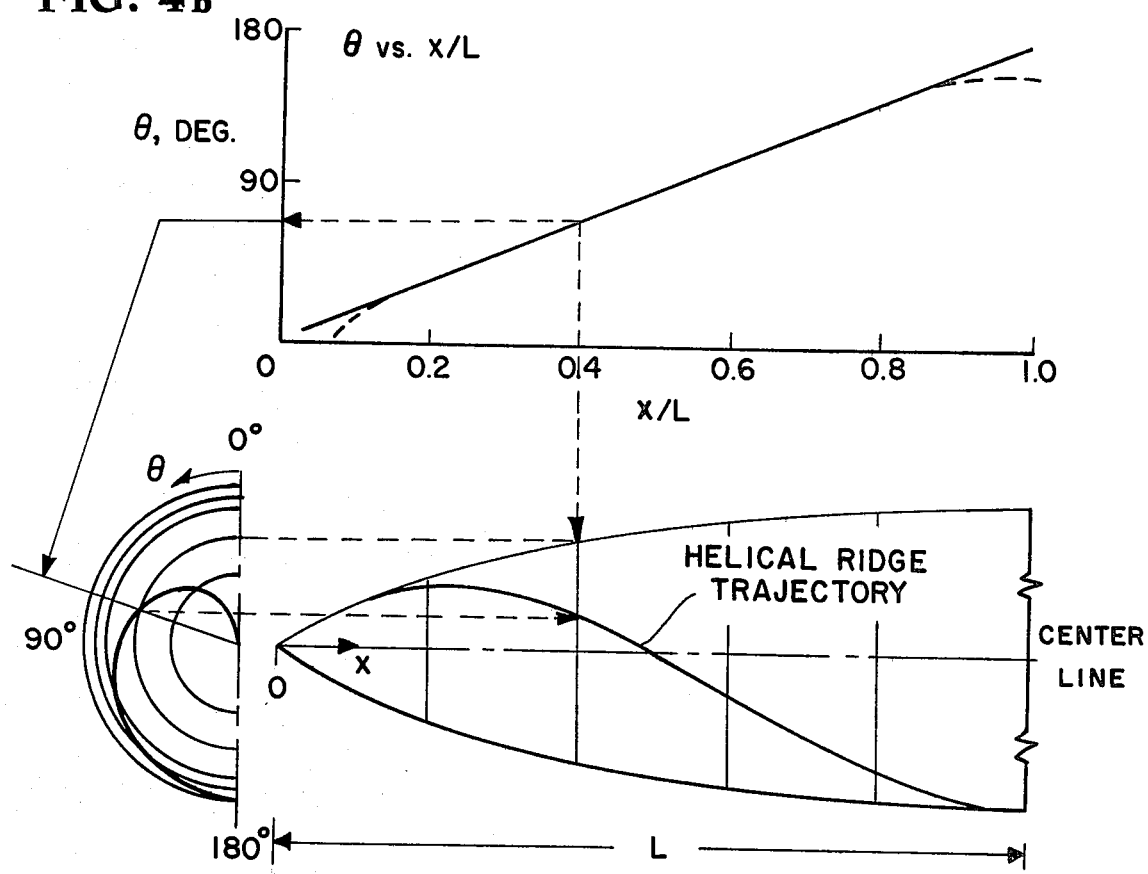
FIG. 4b
FIG. 4c  FIG. 4a
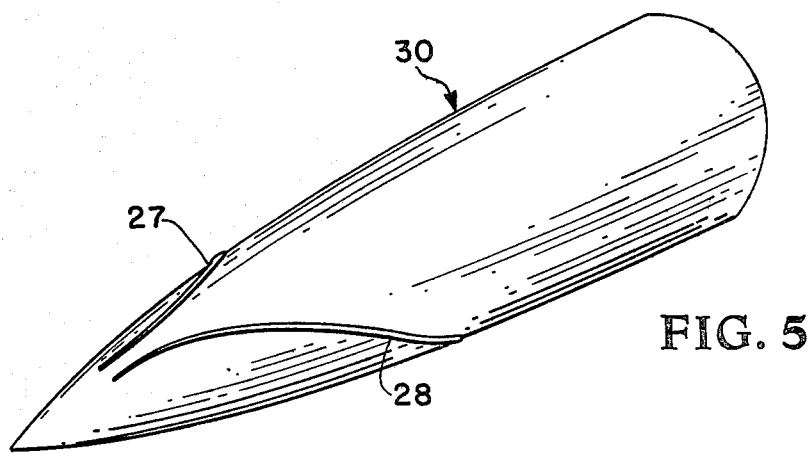
FIG. 5

AERODYNAMIC SIDE-FORCE ALLEVIATOR MEANS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Combat agility requirements in the new generation of fighter aircraft have emphasized the need for controlled flight capability to increasingly high angles of attack. Such aircraft commonly employ pointed forebody shapes which characteristically experience abrupt and relatively large out-of-plane aerodynamic load when pitched to high angles. With degraded control effectiveness also encountered under such conditions, serious handling difficulties can result. Suppression or alleviation of the forebody side forces (and related yawings moment) thus has an important role in the current efforts to evolve aerodynamic configurations of improved controllability at extreme nose-high attitudes.

The out-of-plane force arising from asymmetric development of the leeward vortex wake of slender lifting bodies has attracted increasing attention in recent years by researchers in both government and industry. In this research, the two-dimensional impulsive flow analogy has provided useful conceptual and analytical framework, although its limitations are now increasingly being recognized. Recent experimental results have emphasized the influence of the vehicle nose shape on the outset and build up of side-force. This result is of particular significance to the engineering problem of side-force suppression by aerodynamic means. However, lacking comprehensive knowledge of the leeward flow-field impedes a rational approach.

Perhaps the best known among the side force alleviation devices for slender pointed bodies so far investigated are the nose-strakes. When suitably located near the body nose tip, strakes in many cases have successfully overcome the asymmetry problem, but sometimes at the expense of directional stability on aircraft configurations, as reported in NASA TN D-7716 (1974). Nose-strake performance appears to be overly dependent on the forebody configuration, and the development of effective strakes for a specific application seems to require much trial and error.

Detracting from the usefulness of nose-strakes, is the possibility of adverse interaction of strake vortices with downstream components such as air intakes, control surfaces, etc. The strakes must of necessity be mounted near the tip of the nose radome, where they are a potential source of disturbance in radar operation. Keeping in view such practical considerations, an alternative approach to the problem has led to the present invention, i.e., a new device for side-force alleviation.

Accordingly, it is an object of the present invention to provide apparatus for alleviation of side force encountered at high angles of attack by slender pointed forebodies.

It is another object of the present invention to provide apparatus for improving the high angle of attack flight characteristics of aerodynamic vehicles.

Another object of the present invention is the provision of surface changes to a slender pointed forebody for side force alleviation at high angle of attack.

A further object of the present invention is apparatus for cylindrical vortex wake suppression of slender pointed forebodies during high angle of attack maneuvers.

The foregoing and other objects are attained by the present invention by causing the normal fluid flow about a pointed slender body at angle of attack to separate at varying meridional locations along the body length.

It has been shown that the phenomenon of vortex shedding, which can lead to large oscillatory lateral forces on cylinders in cross flow, can be largely suppressed by means of certain types of separation trips attached to the cylinder. These trips force the boundary layers to separate at varying peripheral positions on different sections of the cylinder. The shed vorticity is thus rendered highly nonuniform along the cylinder, preventing its concentration into discrete two-dimensional cores. Consequently, asymmetrical vortex growth and shedding is replaced by random turbulent wake and the development of cross force on the cylinder suppressed.

In the present invention the leeside vortex pair resulting from meridional separation lines on either side of the exemplary lifting, pointed, slender body are disrupted by forcing separation to occur at varying meriodional locations along the forebody length by means of a suitable separation trip. In the preferred embodiment of the present invention this separation trip consists of a continuous helical ridge, running from the top meridian near the nose tip to a position near the bottom meridan of the forebody, symmetrically on either side of the pitch plane. The trajectory of the trip is such that it lies approximately normal to the boundary layer flow direction to effectively promote separation at large angles of attack while minimizing the drag penalty under normal flight conditions.

BRIEF DESCRIPTION OF THE DRAWINGS

A more complete appreciation of the present invention and many of the attendant advantages thereof will be readily apparent as the same becomes better understood with reference to the following detailed description when considered in connection with the accompanying drawings wherein.

Figure 3A:
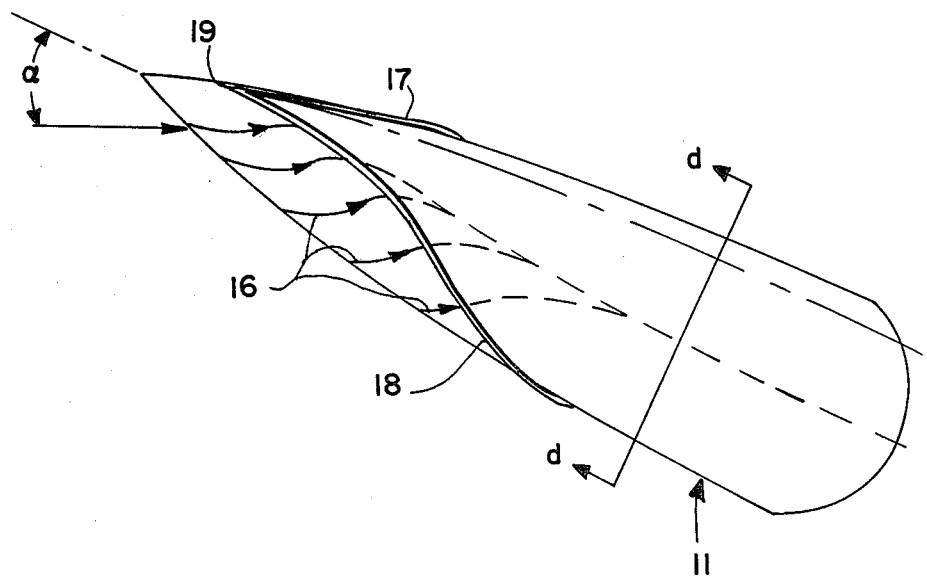
FIG. 3a is a view of a tapered slender cylindrical forebody and schematically illustrating the helical trip theory of the present invention.

FGIS. 3b and 3c are somewhat schematic cylindrical sections illustrating the normal fluid dynamic process of vortex pair formation on the leeside of a slender lifting body and having intial symmetry (3b), but developing asymmetry at a critical angle of attack (3c);

FIG. 3a is a schematic section taken along line d—d of FIG. 3a and illustrating how a multiplicity of diffused vortices are formed instead of the vortex pair of the prior art;

FIGS. 4a, 4b and 4c are schematic illustrations of the helical ridge geometry utilized in constructing the present invention; and FIG. 5 is a view of truncated trips employed as side force alleviators according to the present invention.

DETAILED DESCRIPTION OF THE INVENTION

Figure 1:
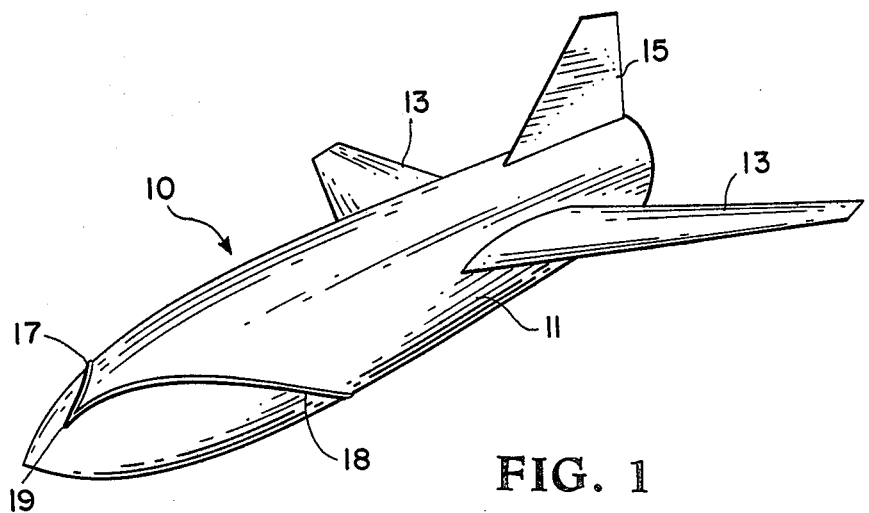
FIG. 1 is a perspective view of a winged fuselage utilizing the present invention.

Referring now to the drawings and more particularly to FIG. 1 there is shown an aircraft generally designated by reference numeral 10 and provided with a pointed slender fuselage 11, a pair of wings 13 and a vertical tail 15. A symmetrical pair of ridges 17 and 18 start at the lee-meridian or top surface of fuselage 11 at a common point 19 near the nose tip thereof and follow a helical path around the fuselage sides to terminate near the bottom rear of the fuselage forebody. In the illustrated embodiment of FIG. 1, the fuselage forebody would terminate forward of the wings 13 with the fuselage afterbody serving as support structure for wings 13 and tail 15.

Figure 2:
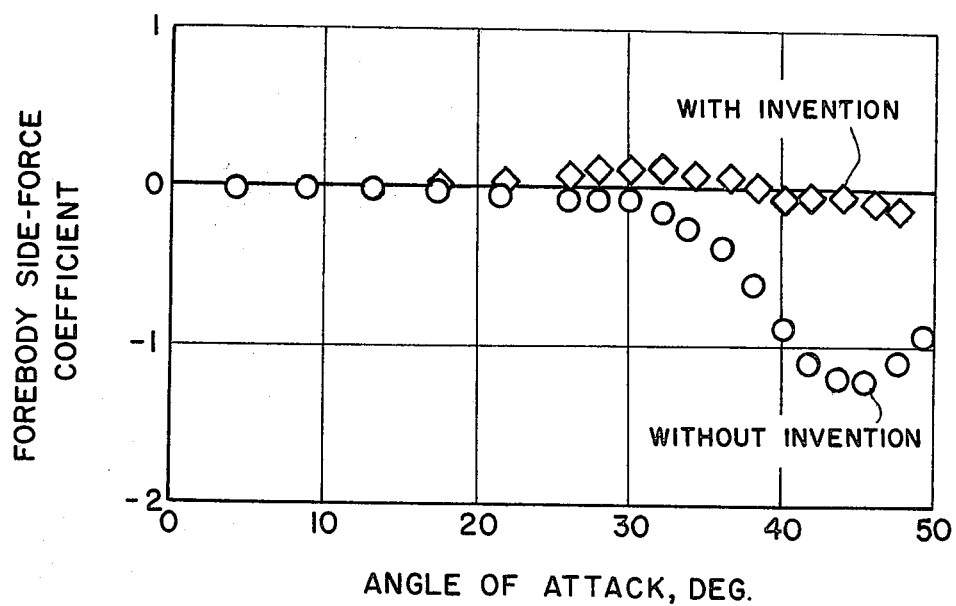
FIG. 2 is an exemplary graphic representation of forebody side force relative to vehicular angle of attack with the present invention and for the same vehicular configuration without the invention.

As graphically illustrated in FIG. 2, the side force on the vehicle 10 is almost totally suppressed during increasing angle of attack when employing the helical ridges 17 and 18. The suppression of yawing moments on vehicle 10 was also evident to the limit of the angle of attack range while identical vehicle configurations without the helical ridges of the present invention experienced violent lateral oscillations or buffeting at angles of attack approaching 50° in wind tunnel tests.

Figure 3B:
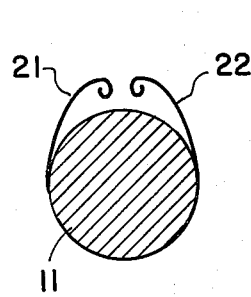
Figure 3C:
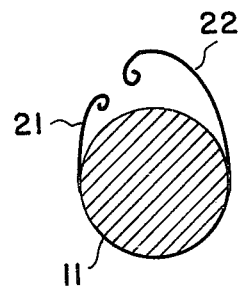
Figure 3D:
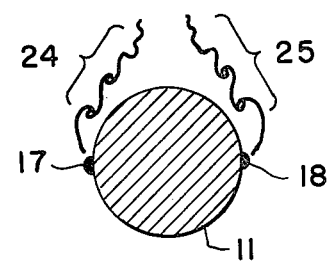

The theory of side force and yawing moment suppression is better exemplified by reference to FIGS. 3a, 3b, 3c and 3d. As shown therein, at high angles of attack (FIG. 3a) the helical ridges 17 and 18 serve to disrupt the vorticity feeding mechanism that normally are produced about a cylindrical surface (FIG. 3b) to thereby convert the vortex asymmetry normally expected (FIG. 3c) to a multiplicity of diffused vortices as schematically illustrated in FIG. 3d. More specifically, the symmetrically disposed pair of ridges 17 and 18 follow a surface trajectory such that when vehicle 10 approaches the angle of attack $\alpha$ for side force onset, the forebody boundary layer flow is directed predominently at right angles to the ridges 17 and 18 and forced to separate at the ridge location (arrows 16 in FIG. 3a) as controlled by the ridge height. At lower angles of attack the ridges 17 and 18 lie highly slanted relative to the boundary layer flow and thus cause only a minor disturbance in the flow.

These ridges 17 and 18 are intended to disrupt the normal fluid dynamic process of vortex pair formation on the leeside of a slender lifting body. Flow separation along meridional lines on either side of the body (i.e., fuselage 11) normally generate continuous free-shear layers which roll up into two discrete vortex cores 21 and 22 (FIG. 3b). Although these vortex cores are initially symmetrical with respect to the vehicle pitch plane, they develop asymmetry at a critical angle of attack, as shown schmatically in FIG. 3c, and lead to side force onset.

By utilizing helical ridges 17 and 18 of the present invention, boundary layer flow is forcibly separated at varying peripheral locations along the fuselage forebody. This flow separation generates highly non-uniform shear layers to thereby inhibit the formation of the vortex pair. Thus, these non-uniform shear layers produce a multiplicity of diffused vortices shown in FIG. 3d represented by reference numerals 24 and 25 and which have a reduced tendency to lock into an asymmetrical mode and thereby lead to side force alleviation.

Referring now more particularly to FIGS. 4a, 4b and 4c, the helical ridge geometry will be explained. As shown therein, the helical ridge trajectory is obtained through a prescribed variation of the meridional angle $\theta$ (measured from the top or leeward meridian), with increasing axial distance x from the forebody nose tip. The simplest form of this variation is linear (from $\theta = 0°$ at $x = 0$ to $\theta = 180°$ at $x = L$, and where L is the forebody length. These FIGS. illustrate the graphical construction of the ridge trajectory for the case of an axi-symmetric ogival forebody as employed for vehicle 10 (FIG. 1). This procedure is equally applicable to other forebodies with smooth non-circular cross sections, and also to those having cambered centerlines. FIG. 4b, illustrating the linear variation of $\theta$ with x/L shows that minor deviations near the end points, as indicated by dashed lines, may be allowed and may be required for practical reasons without materially compromising the ridge effectiveness. Also, the end portion of the helical ridges would be tapered and faired into the forebody surface for aerodynamic efficiency.

The essential function of ridges 17 and 18 being to force boundary layer separation, the height thereof should be just sufficient for this purpose, in order to keep the drag penalty to a minimum. This minimum height will be related to the local boundary layer thickness on the forebody. However, the boundary layer not only will be variable along the ridge, but also will change with the flight parameters, including angle of attack. Furthermore, the forebody boundary layer will be highly three-dimensional in structure, and under these conditions the minimum ridge height to ensure separation cannot be precisely calculated. From experiments on wind tunnel models with circular section ridges, it is found that a uniform ridge diameter of approximately two percent of the maximum forebody cross section diameter will be adequate for typical fighter type aircraft configurations. With this as a starting point, the final ridge dimension for a particular full scale vehicle may be fine-tuned through flight tests but would not be expected to exceed approximately three percent of the maximum forebody cross section diameter in any application. Preferably the cross section area of ridges 17 and 18 would be non-circular, i.e., a flat area to be disposed adjacent and attached to the surface of the forebody but a curved or arched surface exposed to the boundary layer flow for minimum drag. Square, rectangular or triangular cross sectional ridges may be employed; however, with substantially the same effectiveness being obtained, but possibly with smaller height than for circular section ridges. The attachment of ridges 17 and 18 to the forebody of fuselage 11 may be accomplished by any conventional attachment mechanism, for example, adhesives, welding, riveting, bolts or the like. In a specific application, an epoxy adhesive was employed to attach aluminum wire helical ridges to a vehicle 10. Any conventional metal, alloy or composite material used in aerodynamic configuration that will withstand the flight environmental anticipated may be employed for constructing the ridges of the present invention. In some applications it may be desirable to form the helical ridges by molding with the forebody as constructed but for retrofitting in-service aircraft, and in most applications, the use of conventional attachment therefor, as discussed hereinabove proves adequate. In this respect, ridges 17 and 18 may be provided with suitable flared flanges along the entire length thereof or holes may be drilled directly into the ridges for attachment mechanism where needed.

Truncated trips or helical ridges 27 and 28 as shown for forebody 30 in FIG. 5 are useful when the vehicle radome may be adversely affected by the helical trips 17 and 18 as employed in the embodiment illustrated in FIG. 1.

It is thus seen that the present invention provides apparatus for alleviation of the side force generated at high angles of attack or slender pointed forebodies. In subsonic wind tunnel balance tests up to an approximately 55° angle of attack on representative forebody shapes, and on vehicle models as shown in FIG. 1, the effectiveness of the helical separation trips of the present invention in greatly reducing the zero yaw side force and yawing moment has been proven. The efficiency of the trips of the present invention appears to be independent of the forebody geometry. Thus, any bank-to-turn type missile or combat aircraft having pointed slender bodies would appear to benefit from use of the present invention. This side force alleviation is equally applicable to axi-symmetrical ogival-cylinder and cone-cylinder forebodies as well as the non-circular pointed fuselages of missiles and winged aircraft. Also, the use of the present invention offers the possibility of missile and aircraft forebody shaping or design free from side force considerations.

Although a specific embodiment has been described herein, the precise shape of the helical trip trajactory does not appear critical and this will serve as an aid in retrofitting in-service aircraft and missiles. This added capability to our aircraft and missiles should greatly improve the flight characteristics thereof in alleviating side load problems now encountered when these aircraft and missiles are pitched to high angles of attack and thereby experience sudden onset of side force.

Also, it is to be understood that modifications and variations of the specific embodiments described herein will be readily apparent to those skilled in the art in light of the above teachings without departing from the spirit or scope of the appended claims. For example, depending on the precise forebody shape in elevation and cross section, a different trip trajectory and trip end points may be found to give more optimum results. Also, the continuous trips of the illustrated embodiments may in some instances, be replaced by several meridional segments at varying peripheral locations. These and other variations in the invention, as described herein, may be employed subject to vehicle design in minimizing the incremental drag in cruising flight and other aerodynamic and structural considerations. It is therefore to be understood that the invention may be practiced otherwise than as specifically described.

What is claimed as new and desired to be secured by letters Patent of the United States is:

1. In combination; an aerodynamic body having a pointed forebody and a relatively long, slender, cylindrical afterbody, and means for alleviating abrupt and out-of-plane aerodynamic loads on the aerodynamic body during high angles of attack flight; said means consisting of a symmetrical pair of ridges disposed on the pointed forebody and starting on the upper surface of said forebody near but spaced from the nose tip thereof and diverging along separate helical paths along the circumference of said forebody.

2. The combination of claim 1 wherein said symmetrical pair of ridges start at spaced points on the upper surface of said forebody near the nose tip thereof and terminate on the lower surface of said forebody.

3. In combination; an aerodynamic body having a pointed forebody and a relatively long, slender, cylindrical afterbody, and ridge means for alleviating abrupt and out-of-plane aerodynamic loads on the aerodynamic body during high angles of attack flight, said ridge means comprising a pair of symmetrical helical trips integrally secured to the circumference of the pointed forebody and starting at a common point near the nose tip of the pointed forebody; said pair of helical trips diverging along helical paths from said common point and terminating on the lower surface of said forebody.

4. The combination of claim 3 wherein said ridge means has a height in the range of two-three percent of the maximum forebody cross section diameter.

5. The combination of claim 3 wherein the helical ridge trajectory is obtained through a linear variation of the meridional angle of said forebody from 0° to 180° with said ridge length increasing linearly as the angle increases to the desired length.

6. The combination of claim 5 wherein said helical ridge trips are provided with tapered end surfaces that fair into smooth contact adjacency with the forebody surface.

* * * * *